United States Patent [19]
Ogino

[11] Patent Number: 5,859,675
[45] Date of Patent: *Jan. 12, 1999

[54] HIGH EFFICIENCY COLOR LIQUID CRYSTAL DISPLAY

[75] Inventor: Masanori Ogino, Yokohama, Japan

[73] Assignee: Hitachi, Ltd., Tokyo, Japan

[*] Notice: The term of this patent shall not extend beyond the expiration date of Pat. No. 5,623,348.

[21] Appl. No.: 464,578

[22] Filed: Jun. 5, 1995

Related U.S. Application Data

[62] Division of Ser. No. 104,479, Jul. 28, 1993, Pat. No. 5,623,348.

[30] Foreign Application Priority Data

Feb. 26, 1993 [JP] Japan .................................... 5-037824

[51] Int. Cl.$^6$ ............................................ G02F 1/1335
[52] U.S. Cl. ................... 349/5; 349/62; 349/95
[58] Field of Search .................................. 359/40, 49, 41,
359/48, 418, 619, 622, 621, 623; 353/38,
31, 122, 102; 348/761, 769; 349/5, 62,
95

[56] References Cited

U.S. PATENT DOCUMENTS

| 5,083,554 | 1/1992 | Zampolin et al. | 359/40 |
|---|---|---|---|
| 5,101,279 | 3/1992 | Kurematsu et al. | 359/40 |
| 5,161,042 | 11/1992 | Hamada | 359/41 |
| 5,187,599 | 2/1993 | Nakanishi et al. | 359/41 |
| 5,349,453 | 9/1994 | Munakata | 359/40 |

FOREIGN PATENT DOCUMENTS

| 4-70715 | 3/1992 | Japan | 359/40 |

OTHER PUBLICATIONS

R. J. Wohl "Short Length Optical System" IBM Technical Disclosure Bulletin–vol. 13–No.10–Mar. 1971–p.2947.
Pennington et al. "CCD Imaging . . . Gathering Ability" IBM Tech. Discl. Bulletin –vol. 21–No.2–Jul. 1978–pp.857–858.

Primary Examiner—William L. Sikes
Assistant Examiner—Tai V. Duong
Attorney, Agent, or Firm—Antonelli, Terry, Stout & Kraus, LLP

[57] ABSTRACT

A liquid crystal display has a light source unit and a liquid crystal panel unit, and includes a unit for emitting rays having wavelengths corresponding to the primary colors in respective three directions, a lens group unit provided on the light incident side of the liquid crystal panel unit; and a lens group unit provided on the light emitting side of the liquid crystal panel unit and having a focal plane disposed outside the liquid crystal panel unit. Angles of propagation directions of emitted rays of the primary colors are made different from one another by the primary-colors three direction emitting unit, the rays of the primary colors are introduced into respective picture elements corresponding to the primary colors by the panel-light incident side lens group unit, and the propagation directions of the emitted rays of the primary colors are made to substantially coincide with one another by the panel-light emitting side lens group unit.

16 Claims, 8 Drawing Sheets

F I G. 6
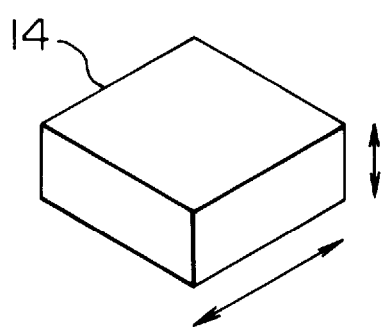
F I G. 7
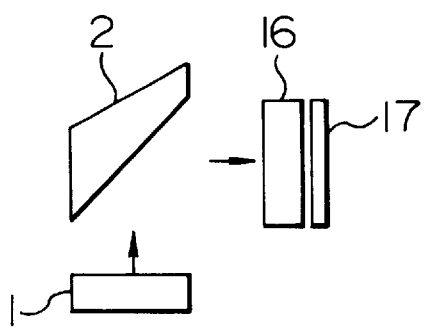

HIGH EFFICIENCY COLOR LIQUID CRYSTAL DISPLAY

CROSS-REFERENCE TO RELATED APPLICATION

This is a division of application Ser. No. 08/104,479 filed on Jul. 28, 1993, now U.S. Pat. No. 5,623,348.

BACKGROUND OF THE INVENTION

The present invention relates to a high efficiency color liquid crystal display, and more particularly to a liquid crystal display having a high light utilization efficiency.

In a prior art color liquid crystal panel, a large number of sets of picture elements are formed with picture elements of the primary colors of R (red), G (green) and B (blue) constituting each set. The picture elements corresponding to the respective primary colors contain corresponding pigments. Therefore, when applying white light to the color liquid crystal panel, the picture elements corresponding to R, G and B transmit only rays having wavelengths corresponding to these pigments. As a result, the efficiency of utilizing light is degraded theoretically to about ⅓ or less because each one pigment corresponding to the associated primary color absorbs the rays having wavelengths corresponding to the other two primary colors. Actually, since the pigments do not have ideal characteristics, the efficiency of utilizing light is degraded to about ⅕.

SUMMARY OF THE INVENTION

It is therefore an object of the present invention to provide means for increasing the efficiency of utilizing light of a color liquid crystal panel up to about 3 times as large as that of the prior art one.

It is another object of the present invention to provide a projection display having excellent light utilization efficiency to which the above-mentioned means is applied.

In order to attain the above-mentioned objects, the fundamental embodiment of the present invention includes:

(a) liquid crystal panel means and light source means for emitting substantially parallel white light having a finite divergence angle $\omega$;

(b) three-direction means for emitting rays having wavelengths corresponding to the primary colors in three respective directions;

(c) first lens group means provided at the light incident side of the panel means; and (d) second lens group means provided after the first lens group means.

Each lens group means may be replaced with lenses arranged in a matrix.

The three-direction means serves to decompose incident white light from the light source means into primary color components and to emit rays having wavelengths corresponding to the primary colors in three respective different directions. In this connection, an angle $\phi$ between the three directions taken two at a time is made larger than the divergence angle $\omega$.

The first lens group means has the function of making the three different directions correspond to the positions of respective ones of the picture elements of the primary colors which are included in the liquid crystal panel. Therefore, only the rays having wavelengths corresponding to R, G and B are made incident on the picture elements corresponding to R, G and B, respectively. As a result, the efficiency of utilizing light can be increased up to 3 times as large as that of the prior art.

On the other hand, the second lens group means has the function of changing the three different directions to substantially one direction. Therefore, the directions of the emitted rays having wavelengths corresponding to the primary colors can be made to substantially coincide with one another. As a result, it is possible to provide a bright and beautiful color image.

BRIEF DESCRIPTION OF THE DRAWINGS

FIG. 6 is a schematic perspective view showing an external form of a projection lens used in the embodiment shown in FIG. 4;

FIG. 7 is a schematic horizontal view showing a direct view display as another embodiment of the present invention;

DESCRIPTION OF THE PREFERRED EMBODIMENTS

When disclosing the present invention hereinafter, for the sake of making the understanding easy, it is assumed that a value of the refractive index n of a liquid crystal panel and various lens media is 1.5. In addition, a liquid crystal panel, the size of which is 10", i.e., 200 mm wide×150 mm high, is taken by way of example to describe the preferred embodiments. In this case, the number of picture elements is about 640×3 horizontally and about 480 vertically. The horizontal pitch of the picture elements is 0.1 mm and the vertical pitch thereof is 0.3 mm. But, it should be noted that since a proportional dimensional change can be made without affecting the essence of the optical system, the present invention is not limited to the above numerical example.

Figure 1:
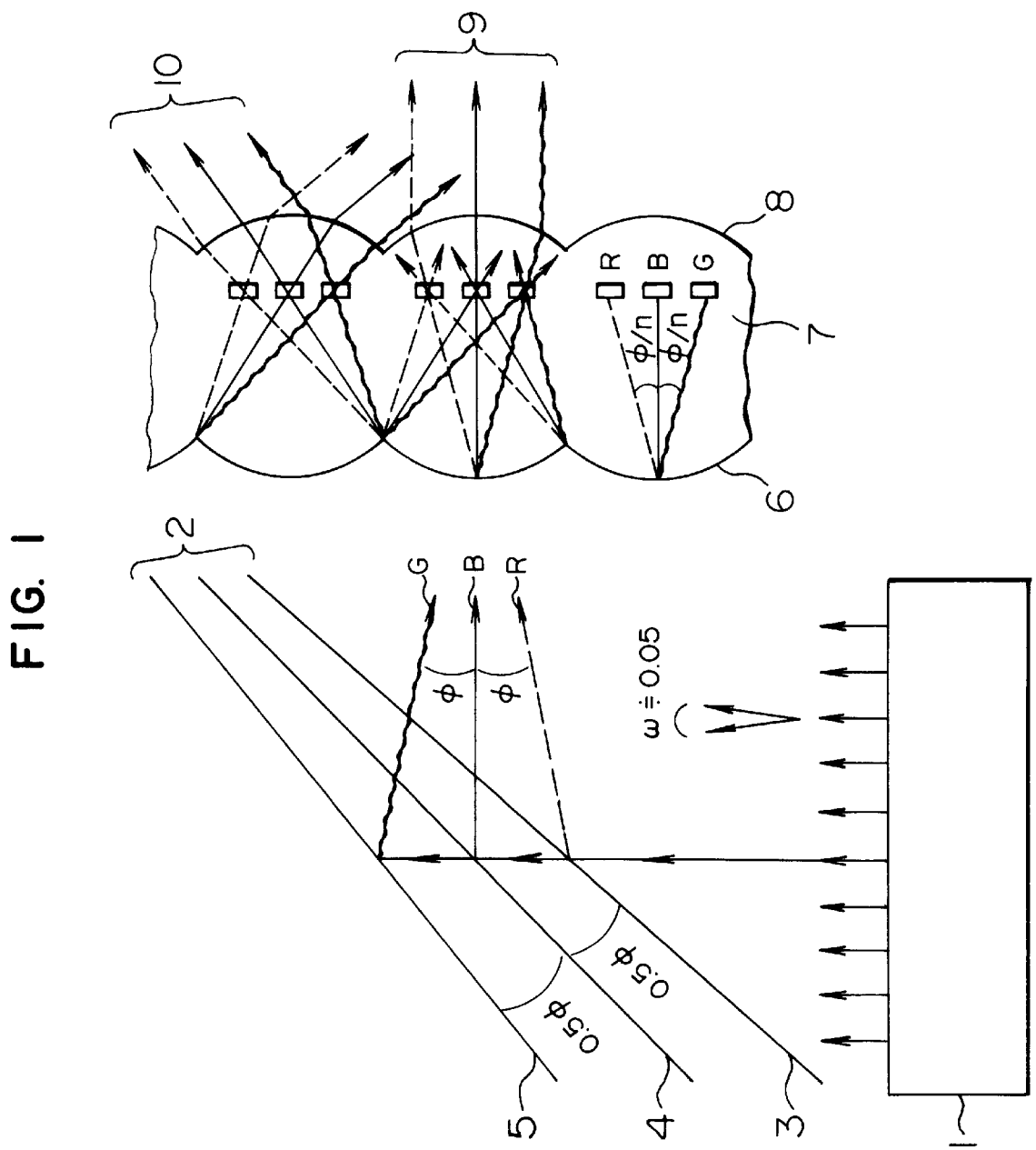
FIG. 1 is a schematic horizontal sectional view showing the fundamental embodiment of the present invention.

FIG. 1 is a horizontal sectional view showing the fundamental embodiment of the present invention. In the figure, the reference numeral 1 designates light source means for emitting substantially parallel white light, which is well known. Then, it is assumed that a light divergence angle of the light source means is $\omega$ (when describing the numerical example of the present invention, the description is given with respect to the specific case where a value of ω is about 0.05 radian). The light divergence angle represents an error or dispersion of parallelism of the emitted rays. The reference numeral 2 designates three-direction means for emitting rays having wavelengths corresponding to the primary colors in three respective different directions, which is constituted by three sheets of mirrors. The reference numeral 3 designates a mirror for reflecting red rays, the reference numeral 4 designates a mirror for reflecting blue rays, and the reference numeral 5 designates a mirror for reflecting green rays. The red-rays reflecting mirror 3 transmits both the green rays and the blue rays. The blue-rays reflecting mirror 4 transmits both the red rays and the green rays. These reflecting mirrors can be realized by the well known dichroic mirror technology. An angle between the reflecting mirrors 3, 4 and 5 taken two at a time is 0.5 ϕ. The rays after the reflection by the respective mirrors are illustrated distinctively. That is, R (red), B (blue) and G (green) are respectively represented by a dashed line, a solid line and a corrugated line. An angle between the reflected rays taken two at a time is, as shown in the figure, ϕ. It is assumed that a value of ϕ is larger than that of ω.

The reference numeral 6 designates lenticular lens means arranged on the light incident side of the panel. This lenticular lens means 6, constituting an example of the first lens group means referred to in the summary of the invention, is arranged in such a way that its focal plane coincides in position with a plane on which the picture elements of the liquid crystal panel are arranged. Although in the figure, only three lens elements are illustrated for the sake of simplicity, the number of lens elements is actually equal to the number of sets of R, G and B picture elements. The reference numeral 7 designates the picture elements. The reference numeral 8 designates lenticular lens means, constituting an example of the second lens group means referred to in the summary of the invention, arranged on the light emitting side of the panel. A focal plane of the lenticular lens means 8 is made to coincide with a light incident surface of the lenticular lens means 6. The description of the structure of the present invention has been completed. Next, the operation of the present invention will be described.

The emitted rays from the three-direction means 2 are made incident on the light incident side lenticular lens means 6. Then, the rays of R, G and B are directed toward the respective picture elements of R, G and B. Therefore, there is no need for adding any pigments to the picture elements.

In each picture element, the amount of light transmitted therethrough is controlled based on the principle of the liquid crystal display. But, it should be noted that since the principle of the liquid crystal display itself is well known, only the picture elements are illustrated in the figure and other constituent elements are omitted.

With respect to the rays of the primary colors after passing through the respective picture elements, a difference in angle between the rays of the primary colors taken two at a time is cancelled by the light emitting side lenticular lens means 8. For example, the rays of R, G and B, which have been made incident at angles of +ϕ, 0 and −ϕ on the central part of the lens means 6, respectively, become parallel rays each having 0 degrees therebetween after emission from the lens means 8. The parallel rays are designated by the reference numeral 9. The reference numeral 10 represents that the rays which have been made incident on the end part of the lens means 6 are emitted from the lens means 8 in the form of oblique parallel rays. Since the focal plane of the lens means 8 is made to coincide with the light incident surface of the lens means 6, the direction of the emitted rays from the lens means 8 is dependent only on the incident position of the rays on the lens means 6 and is independent of the incident direction thereof. Therefore, it is possible to make the directional characteristics of the emitted rays of the primary colors coincide with one another. As a result, a bright and beautiful image can be reproduced.

Numerical examples of the lenticular lens means will be described in detail as preferred embodiments so that a person of ordinary skill in the art can utilize the present invention with ease.

Figure 2:
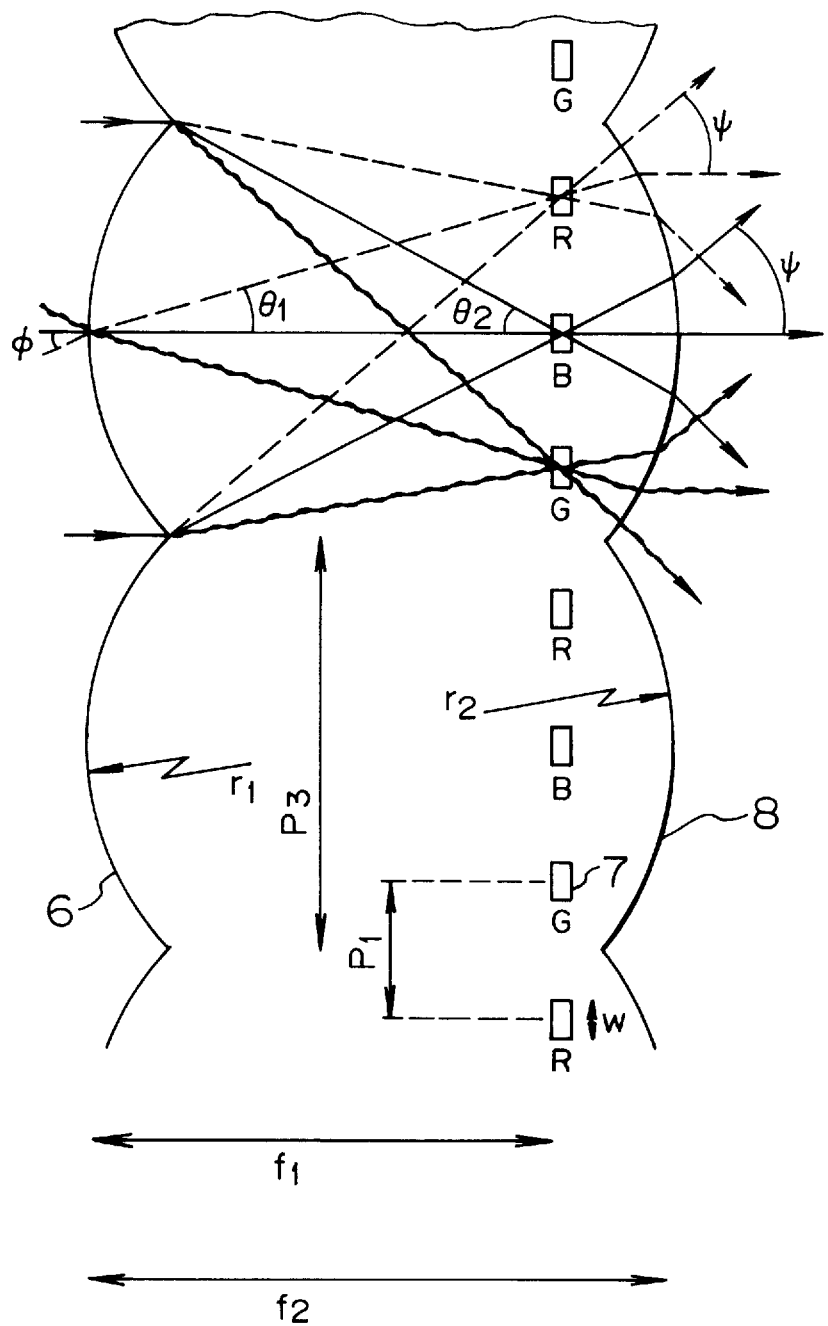
FIG. 2 is a schematic horizontal sectional view showing the main parts of another embodiment of the present invention.

A first embodiment is shown in FIG. 2. In the figure, there is shown the specific case where the value of ϕ is set 3 times as large as that of ω (0.05 radian), a focal length f1 of the light incident side lenticular lens means 6 is 1 mm, and a focal length f2 of the light emitting side lenticular lens means 8 is 1.11 mm. In order to remove spherical aberration of each of the lenticular lens means, the profile of each of the lenticular lens means may have an elliptical configuration in which the eccentricity thereof is equal to the inverse of the refractive index n.

Incidentally, in the present invention, the following relationship is established among the horizontal pitch P1 of the picture elements, the focal length f1 (=1 mm) and the difference ϕ in angle between the incident rays taken two at a time.

$$f1 \cdot \phi = n \cdot P1 \ldots \quad (1)$$

Further, the radii r1 and r2 of curvature in the central part of the lenticular lens means 6 and 8 can be obtained by the following expressions.

$$f1 = n \cdot r1/(n-1) \ldots \quad (2)$$

$$f2 = n \cdot r2/(n-1) \ldots \quad (3)$$

Therefore, on the basis of the two factors, the remaining one factor is obtained. That is, r1=⅓ mm and r2=0.37 mm.

As shown in the figure, a divergence angle Ψ of the emitted rays after emission from the lens means 8 is +0.135 radian. In order to further increase this divergence angle, a light diffusing element may be provided additionally on the light emitting surface of the lens means 8 or in the vicinity thereof.

In this case, an angle θ1 between the propagation direction of the ray (B) which has been made incident on the central part of the light incident surface to the associated picture element (B) and the propagation direction of the ray (R) which has been made incident on the central part of the light incident surface of the lens element to the adjacent picture element (R) is 0.10 radian, and an angle θ2 between the propagation direction of the ray (B) which has been made incident on the central part of the light incident surface of the lens element to the associated picture element (B) and the propagation direction of the ray (B) which has been made incident on the end part of the light incident surface of the lens element to the same associated picture element (B) is 0.15 radian. Moreover, a width w of each picture element is 33 μm which is obtained from the relationship of w=ω/n×f1. Further, in this case, an array pitch P3 of the picture element sets is 3 times as large as the array pitch P1 of the picture elements (P3=3·P1=0.3 mm).

Figure 3:
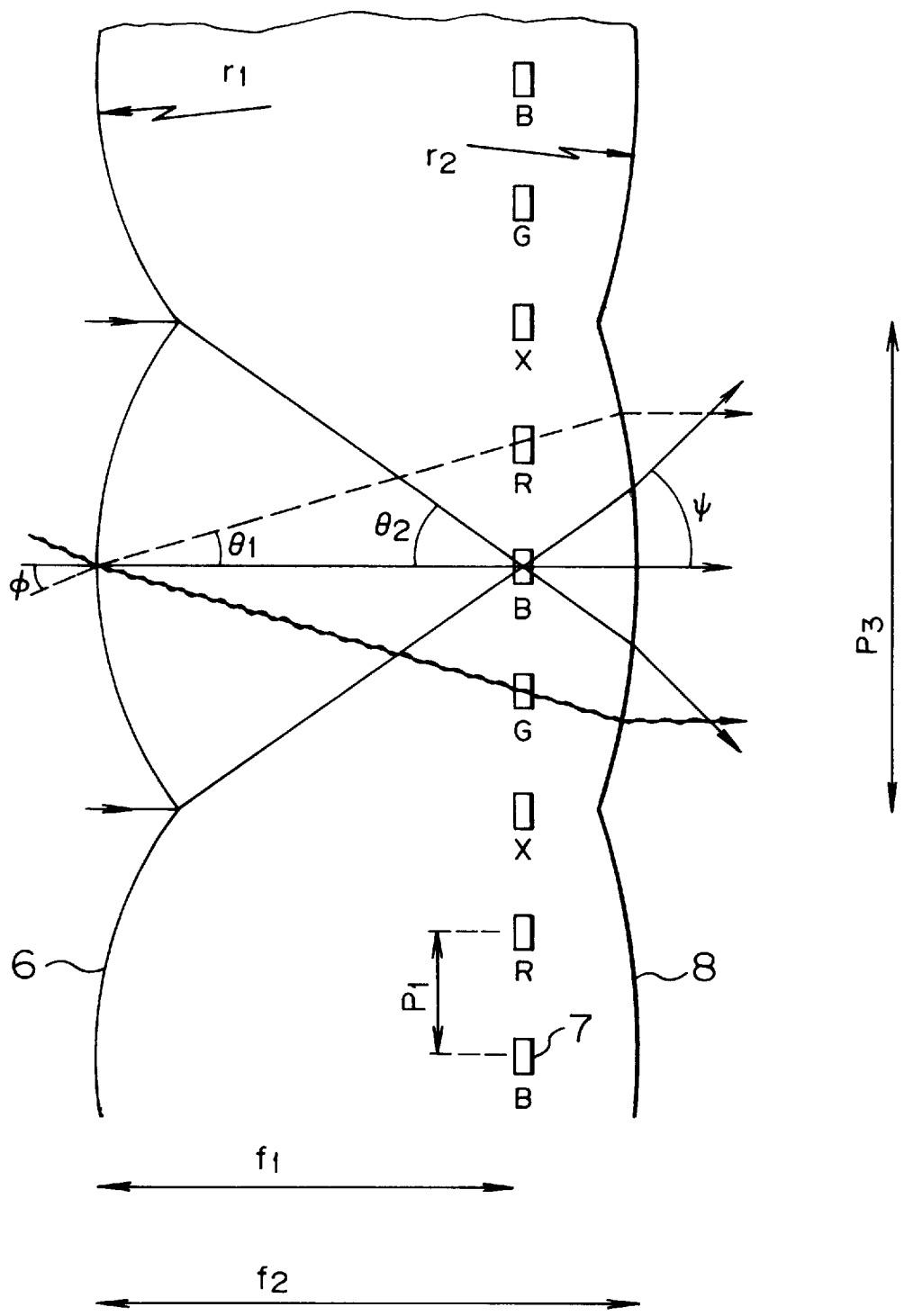
FIG. 3 is a schematic horizontal sectional view showing the main parts of still another embodiment of the present invention.

A second embodiment of the present invention is shown in FIG. 3. The necessary condition for the construction of the present embodiment is that the array pitch P3 of the picture element sets is made larger than 3·P1 (P1 is the array pitch of the picture elements). In this case, P3=0.4 mm. In the figure, out of the four picture elements, one picture element is not used which is indicated by a mark x in the figure. There is shown in the figure the specific case of φ=0.15 radian, f1=1 mm and f2=1.25 mm. Further, in this case, r1=⅓ mm, r2=0.42 mm, Ψ=0.16 radian, θ1=0.1 radian and 6θ2=0.2 radian.

Incidentally, the reason for not using the picture element which is indicated by the mark x is that the positional dispersion in a valley part between the lens elements of the light emitting side lenticular lens means is prevented from causing color irregularity. Also, the wiring pattern or the like of the liquid crystal panel may be arranged in the position of the unused picture element indicated by the mark x.

In the present embodiment, one of every four picture elements is unused. However, the present invention is not limited thereto or thereby. That is, the number of unused picture elements may be increased in such a way that, for example, two of every five picture elements are unused, or three of every six picture elements are unused. In such cases, the resolution is degraded, but the focal length on the light emitting side can be made relatively large.

Figure 4:
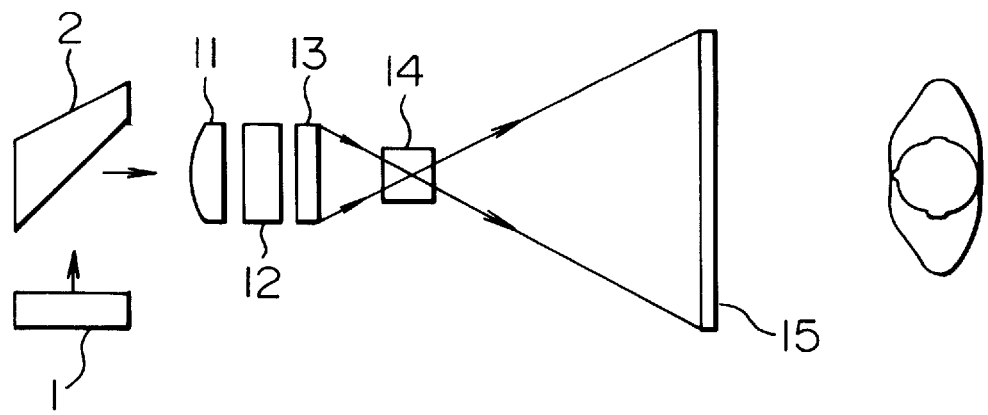
FIG. 4 is a schematic horizontal sectional view showing the main parts of yet another embodiment of the present invention.

FIG. 4 is a horizontal sectional view showing a third embodiment of the present invention in which the present invention is applied to a projection display. First, the structure of the third embodiment will be described. In the figure, the reference numerals 1 and 2 designate respectively the light source means and the three-direction means which have already been described.

The reference numeral 11 designates a cylindrical lens (a one-dimensional lens) for converging the rays horizontally; the reference numeral 12 designates a liquid crystal panel including the main parts 6, 7 and 8 of the fundamental embodiment of the present invention; the reference numeral 13 designates a cylindrical lens for converging the rays vertically; the reference numeral 14, a projection lens; and the reference numeral 15, a screen. In the structure of the present embodiment, the cylindrical lenses 11 and 13 may be omitted. In this case, by taking the above-mentioned divergence angle of the emitted rays from the liquid crystal panel 12, a projection lens having a large aperture needs to be used as the projection lens 14. In any case, according to the present structure, it is obvious that the efficiency of utilizing light can be increased up to 3 times as large as that of the prior art single panel liquid crystal projection display.

The cylindrical lens 11 for converging the rays horizontally serves to converge the rays only horizontally. The reason why the cylindrical lens 11 does not converge the rays vertically is that the contrast of the liquid crystal panel 12 depends on the vertical angle of the rays. Therefore, the function of converging the rays vertically is allotted to the cylindrical lens 13 provided on the light emitting side of the liquid crystal panel 12.

The rays which pass through the liquid crystal panel 12 after being converged by the cylindrical lens 11 have a convergent inclination in the right and left ends of the panel. Therefore, it is desirable that in the above-mentioned embodiments, the array pitches of the lenticular lens means 6 and 8 are corrected to a certain degree. This is shown in FIG. 5.

Figure 5:
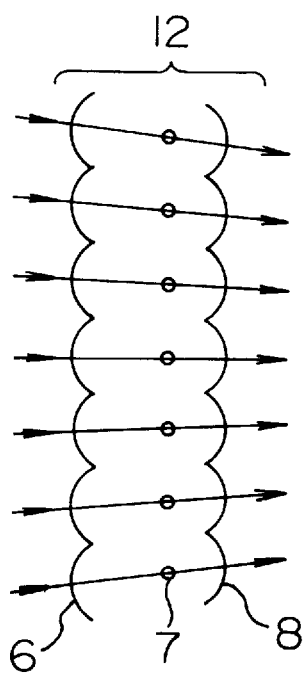
FIG. 5 is a schematic horizontal sectional view showing a liquid crystal panel in the embodiment shown in FIG. 4.

In FIG. 5, the reference numeral 6 designates a light incident side lenticular lens means, the reference numeral 8 designates a light emitting side lenticular lens means, and the reference numeral 7 designates only a blue picture element in the center of each of the picture element sets. As shown in the figure, the pitch of the light incident side lenticular lens means 6 is made larger than that of the picture element sets, and the pitch of the light emitting side lenticular lens means 8 is made smaller than that of the picture element sets.

Incidentally, in FIG. 4, instead of the cylindrical lenses 11 and 13, one-dimensional Fresnel lenses may be employed. In addition, instead of the cylindrical lens 11, each of the mirrors 3, 4 and 5 constituting the three-direction means 2 may be formed so as to have a concave mirror-like configuration.

Next, as the projection lens 14, a normal projection lens having a rotationally symmetric configuration may be employed. However, for the purpose of decreasing the weight and volume of the lens, a projection lens having a pupil having a substantially rectangular shape may be employed.

The reason for this is that in the embodiment of FIG. 3, as shown in the figure, a horizontal light divergence angle Ψ is +0.16 radian, which value is large, whereas a vertical light divergence angle is substantially equal to the light divergence angle of the light source (0.05 radian), which value is small.

Therefore, as the projection lens, a projection lens, a pupil of which has a substantially rectangular shape, may be employed. The external form of such a projection lens is shown in FIG. 6. In this case, the pupil of the projection lens is 0.05 mm in height and 0.16 mm in width.

A construction in which, as an alternative to the light emitting side lenticular lens means 8 in the above-mentioned first and second embodiments, double-lenticular lens means separated from the liquid crystal panel is employed is shown in FIG. 7 as a fourth embodiment of the present invention. In the figure, the reference numerals 1 and 2 designate respectively light source means and three-direction means which are the same as those of the fundamental embodiment of FIG. 1. The reference numeral 16 designates a liquid crystal panel which is constructed by removing the light emitting side lenticular lens means 8 from the liquid crystal panel constituted by the main parts 6, 7 and 8 of FIG. 1. The reference numeral 17 designates double-lenticular lens means.

Figure 8:
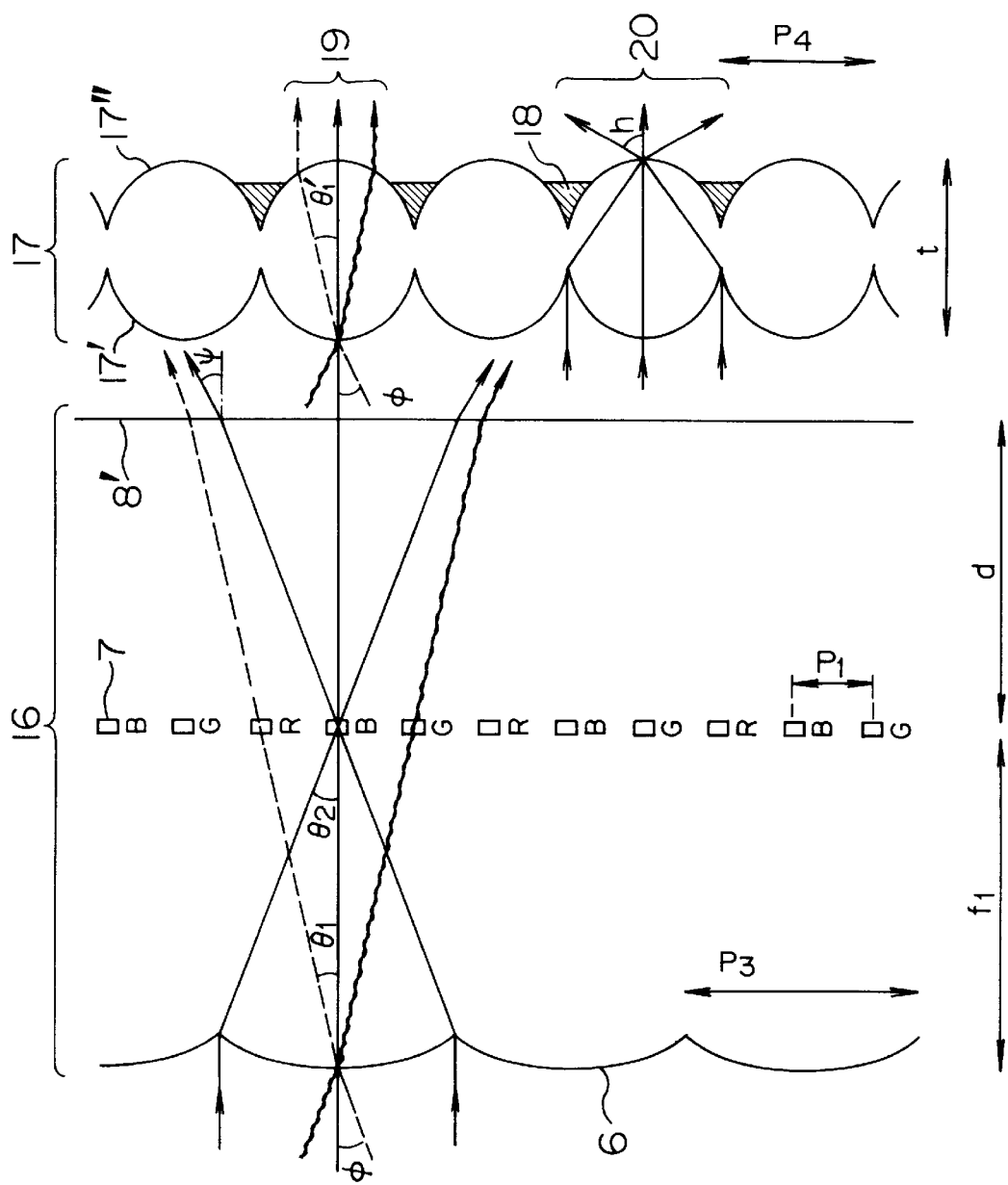
FIG. 8 is a vertical sectional view showing the details of a liquid crystal panel used in the embodiment of FIG. 7.

FIG. 8 is an enlarged detail of construction of the elements 16 and 17. In the figure, the reference numeral designates light incident side light lenticular lens means; the reference numeral 7 designates the picture elements of the liquid crystal panel 16; the reference numeral 8' designates a light emitting surface of the liquid crystal panel 16; the reference numeral 17, the double-lenticular lens means; the reference numeral 17', a lens surface on the light incident side of the lens means 17; the reference numeral 17", a lens surface on the light emitting side of the lens means 17; and the reference numeral 18, black stripes indicated by hatched lines. The black stripes serve to absorb unnecessary extraneous light. In the figure, although the black stripes have a recessed configuration, they may have a projecting configuration. In the figure, each arrow represents the propagation direction of a respective ray. Also, a solid line, a dashed line and a corrugated line correspond to blue, red and green, respectively.

The function of the double-lenticular lens means 17 constituting the main part of the present embodiment will now be described.

The position of a focal plane of the light incident side lens surface 17' is made to substantially coincide with the position of the light emitting side lens surface 17". Therefore, as shown in the group of rays 20 in the figure, a group of incident parallel rays are converged on the light emitting side lens surface 17" and then diverge at a horizontal divergence angle h. When applying the present embodiment to a direct view display, if a thickness t of the double-lenticular lens means 17 is set substantially equal to a pitch P4 of the double-lenticular lens means 17, a value of h of about $\pi/2$ radian can be obtained. Thus, the thickness t is set to 0.3 mm.

As a result, the horizontal field or viewing angle can be increased. But, when applying the present embodiment to a projection display, the thickness t is made sufficiently larger than the pitch P4, whereby the horizontal divergence angle h is set to a small value. A minimum value of h is about 2.5 times as large as the above-mentioned value of $\phi=0.15$ radian, e.g., about 0.38 radian in the present numerical example in the figure.

In FIG. 8, the position of a focal plane of the light emitting side lens surface 17" is made to substantially coincide with the position of the light incident side lens surface 17'. Therefore, as shown by the group of parallel rays 19 in the figure, the rays of the primary colors which have been made incident to one point on the light incident side lens surface 17' are emitted in the form of the group of parallel rays 19 from the light emitting side lens surface 17". That is, the difference in direction between the incident rays of the primary colors can be compensated, and as a result, the directional characteristics of the primary colors can be made to substantially coincide with one another.

The description of the operation of the embodiment of FIG. 8 has been completed.

In the first and second embodiments, it is necessary to make a distance between the picture elements 7 of the liquid crystal panel and the light emitting side lenticular lens means 8 small, and it is necessary to maintain registration therebetween. In the present fourth embodiment, this is not required. Therefore, the construction can be performed with ease.

Further, in the present embodiment, a distance d between the plane of the picture elements and the light emitting surface 8' of the liquid crystal panel 16 is equal to f1 (=1 mm). Thus, at the light emitting surface 8' of the liquid crystal panel 16, the emitted rays from the picture elements 7 diverge to the width of the pitch P3. Then, since P1=0.1 mm, and P3 is set 3 times as large as P1, P3=0.3 mm. Therefore, there is the advantage that it is possible to reduce moire disturbance due to interference between the pattern of the picture elements 7 and the pattern of the double-lenticular lens means 17.

In the present embodiment, the focal length of each of the light incident side lens surface 17' and the light emitting side lens surface 17" may be set about 0.6 to 1.5 times as large as the thickness t. Further, in order to eliminate spherical aberration, as described above, an elliptical surface having an eccentricity equal to the inverse of the refractive index n may be employed. Incidentally, in the present embodiment, $\phi=0.15$ radian, $\theta1=0.10$ radian, $\theta2=0.15$ radian, $\theta1'=0.10$ radian and $\Psi=0.23$ radian. The description of the fourth embodiment has been completed.

Figure 9:
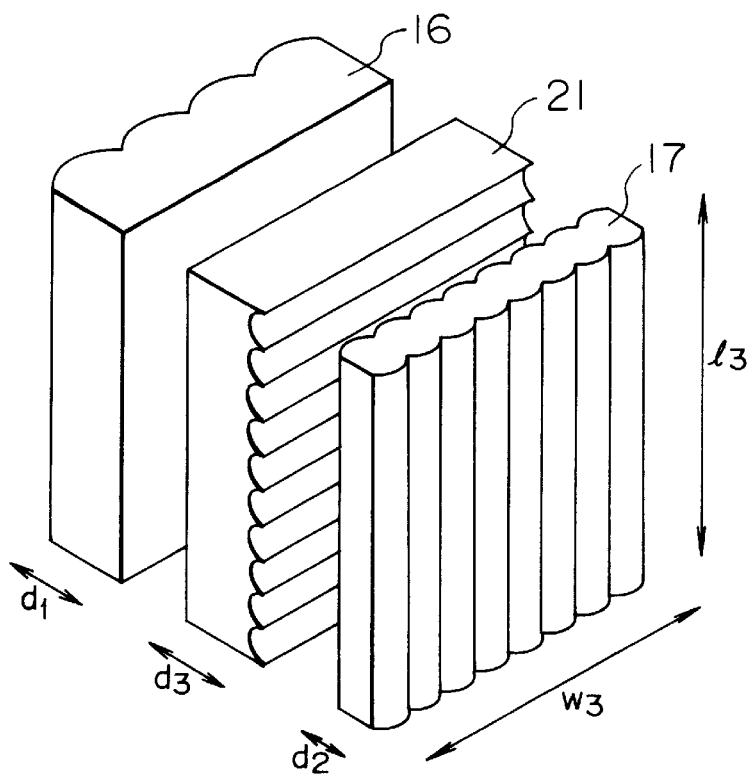
FIG. 9 is a perspective view showing the detailed construction of a direct view display constituting another embodiment of the present invention.

FIG. 9 shows a fifth embodiment of the present invention. The purpose of the present embodiment is to increase the vertical field or viewing angle when applying the present embodiment to a direct view display. A point of difference between the present embodiment of FIG. 9 and the fourth embodiment of FIG. 8 is that in FIG. 9, transverse stripe-like lenticular lens means 21 is additionally provided between the liquid crystal panel 16 and the double-lenticular lens means 17. The provision of this lenticular lens means 21 allows the vertical field or viewing angle to be increased. In this case, a thickness d1 of the panel 16 is 2 mm, a thickness d3 of the lens means 21 is 0.3 mm, and a thickness d2, a width w3 and a height 13 of the lens means 17 are respectively 0.3 mm, 200 mm and 150 mm.

The description of the preferred embodiments of the present invention has been completed. Next, variations of the preferred embodiments will be described.

Figure 10:
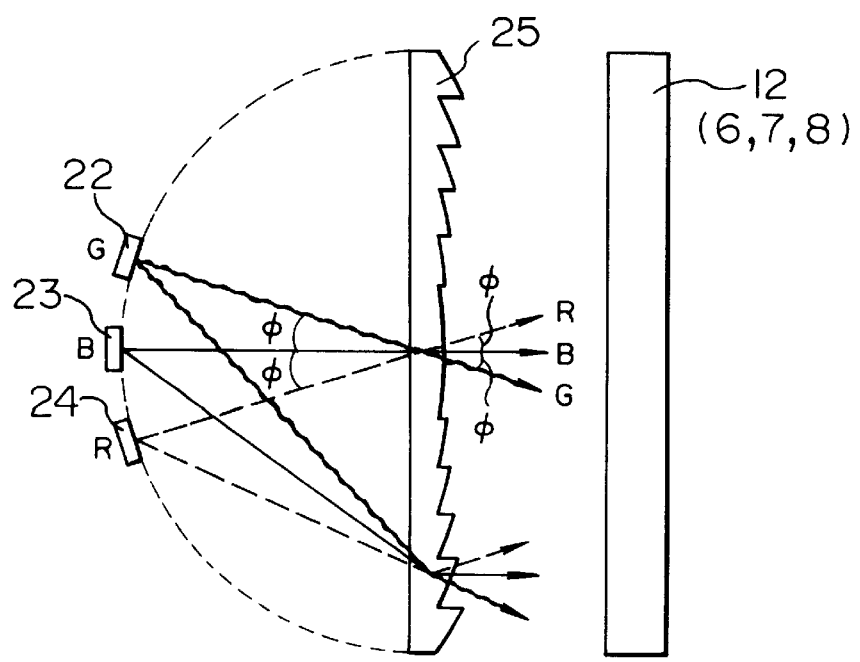
FIG. 10 is a schematic sectional view of a liquid crystal display constituting a variation of the fundamental embodiment of the present invention.

Although the white light source means 1 was used in the fundamental embodiment of FIG. 1, alternatively, the well known three primary color light source means may be employed. The alternative embodiment is shown in FIG. 10. In the figure, the reference numeral 12 designates a liquid crystal panel including the main parts 6, 7 and 8 of the fundamental embodiment of the present invention in FIG. 1. The reference numerals 22, 23 and 24 designate respectively primary color light sources of green, blue and red which are arranged in parallel with one another. The reference numeral 25 designates collimator means which is constituted by a Fresnel lens in the figure. As apparent from arrows of the rays illustrated in the figure, an angle between adjacent ones of the emitted rays of R, G and B from the collimator means 25 (corresponding to an angle which is obtained when viewing the interval between adjacent ones of the three primary color light sources 22, 23 and 24 from the collimator means 25) is substantially equal to $\phi$.

In FIG. 1, the first lens group means 6 was provided on the light incident surface of the liquid crystal panel. However, the first lens group means 6 may be provided in the form of a panel which is outside the liquid crystal panel and is independent thereof. In FIG. 1, the second lens group means 8 was provided on the light emitting surface of the liquid crystal panel. However, the second lens group means 8 may be provided inside the liquid crystal panel by the well known process of modulating the refractive index of a medium.

Figure 11:
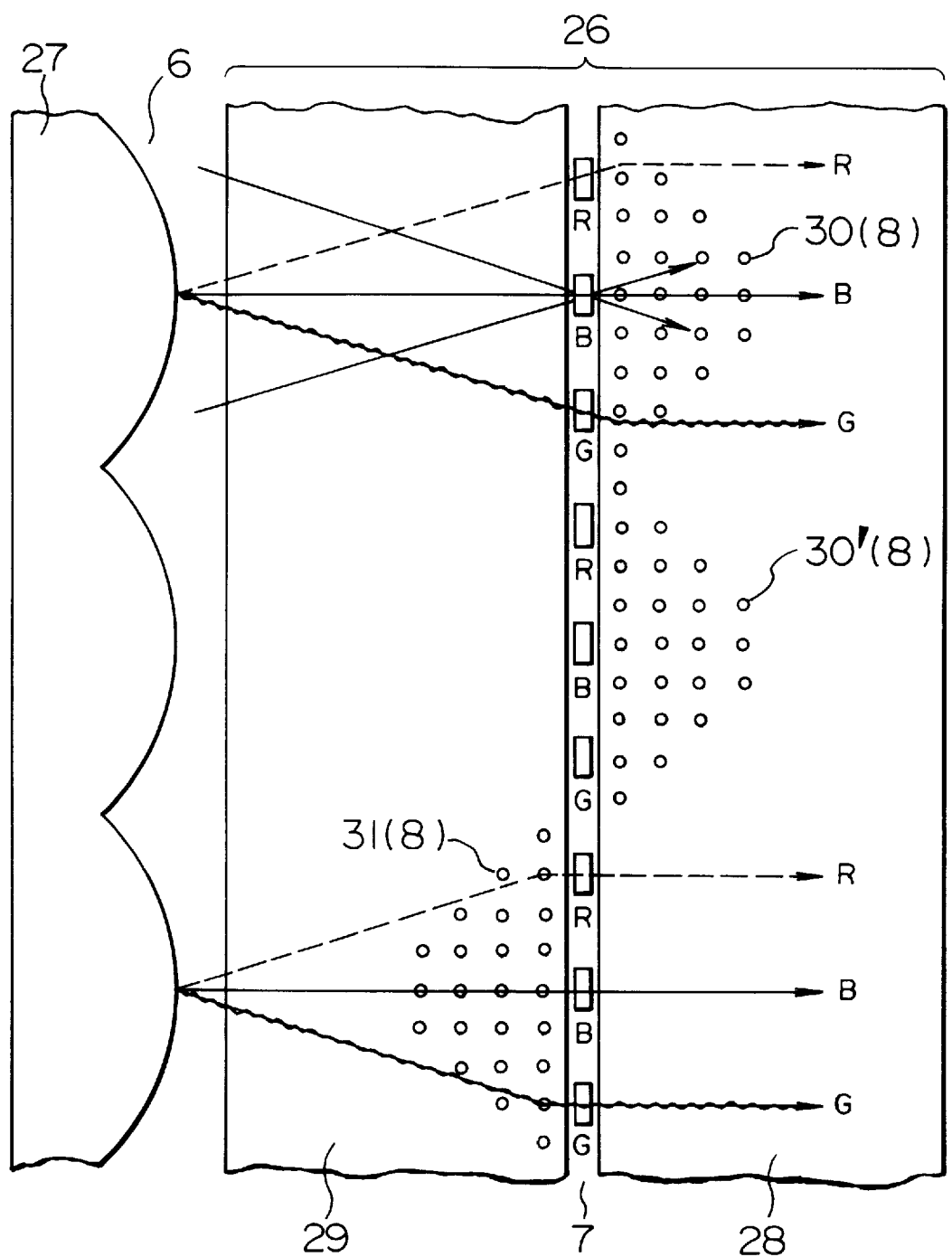
FIG. 11 is a schematic sectional view showing another variation of the fundamental embodiment of the present invention shown in FIG. 1.

FIG. 11 shows such a variation of the main part of the first embodiment of the present invention. In the figure, the reference numeral 26 designates a liquid crystal panel, and the reference numeral 27 designates an independent panel which is provided independently of the liquid crystal panel 26. On the light emitting surface of the independent panel 27, first lens group means 6 is provided. Alternatively, the first lens group means 6 may be provided on the light incident surface of the independent panel 27. The reference numeral 28 designates a light emitting side panel of the liquid crystal panel 26, and the reference numeral 29 designates a light incident side panel of the liquid crystal panel 26. The reference numeral 7 designates the picture elements of the liquid crystal panel 26. The reference numerals 30, 30' and 31 designate second lens group means arranged adjacent to the plane of the picture elements 7 of the liquid crystal panel 26.

A set of small circles in FIG. 11 represent that the refractive index of the part indicated by the set of small circles is larger than that of any other part. Such local modulation of the refractive index can be readily realized by the well known ion exchange process (substituting thallium ions for sodium ions) described in the article SPIE Vol. 892, Miniature Optics and Letters (1988), pages 3 to 11.

As shown in the figure, the function of the first lens group means 6 in FIG. 11 is the same as that of the first lens group means 6 in FIG. 1. In addition, the function of the second lens group means 30, 30' and 31 in FIG. 11 is the same as that of the second lens group means 8 in FIG. 1. The description of FIG. 11 has been completed.

Instead of the one-dimensional lenticular lens means referred to in the description of the present invention, normal two-dimensional lenses arranged in a matrix may be employed.

In the structure of the present invention, it is possible to interchange the horizontal direction and the vertical direction.

As set forth hereinabove, according to the present invention, it is possible to increase the light utilization efficiency of the color liquid crystal panel up to about 3 times as large as that of the prior art one.

I claim:

1. A liquid crystal display having light source means and liquid crystal panel means, comprising:

means for emitting rays having wavelengths corresponding to the primary colors in respective three directions;

lens group means provided on the light incident side of said liquid crystal panel means; and lens group means provided on the light emitting side of said liquid crystal panel means and having a focal plane disposed outside said liquid crystal panel means;

wherein angles of propagation directions of emitted rays of the primary colors are made different from one another by said primary-colors three direction emitting means, the rays of the primary colors are introduced into respective picture elements corresponding to the primary colors by said panel-light incident side lens group means, and the propagation directions of the emitted rays of the primary colors are made to substantially coincide with one another by said panel-light emitting side lens group means.

2. A liquid crystal display according to claim 1, wherein said panel-light emitting side lens group means is constituted by double-lenticular lens means which is separately arranged on the light emitting side of said liquid crystal panel means.

3. A liquid crystal display according to claim 1, wherein said primary-colors three direction emitting means is constituted by three sheets of dichroic mirrors.

4. A liquid crystal display according to claim 1, further comprising projection lens means and screen means.

5. A liquid crystal display according to claim 1, wherein said light source means and said primary-colors three direction emitting means are constituted by three elementary-color light source means which are arranged in parallel with one another and collimator means.

6. A liquid crystal display according to claim 1, wherein said panel-light emitting side lens group means is arranged in the vicinity of a picture element forming plane in said liquid crystal panel means.

7. A liquid crystal display having light source means and liquid crystal panel means, comprising:

means for emitting rays having wavelengths corresponding to the primary colors in respective three directions;

lens group means provided on the light incident side of said liquid crystal panel means; and lens group means provided on the light emitting side of said liquid crystal panel means;

wherein angles of propagation directions of emitted rays of the primary colors are made different from one another by said primary-colors three direction emitting means, the rays of the primary colors are introduced into respective picture elements corresponding to the primary colors by said panel-light incident side lens group means, and the propagation directions of the emitted rays of the primary colors are made to substantially coincide with one another by said panel-light emitting side lens group means;

wherein said panel-light emitting side lens group means is constituted by double-lenticular lens means which is separately arranged on the light emitting side of said liquid crystal panel means; and wherein each of focal lengths of light incident side lenticular lens and light emitting side lenticular lens constituting said double-lenticular lens means is set 0.5 to 1.5 times as large as a thickness thereof.

8. A liquid crystal display including light source means and liquid crystal panel means, the liquid crystal panel means including picture elements corresponding to three primary colors, the picture elements being grouped into a plurality of sets of three picture elements, the three picture elements in each of the sets of three picture elements respectively corresponding to the three primary colors, the liquid crystal display comprising:

three-direction means for receiving light from the light source means, and emitting rays of the three primary colors having three respective mutually different propagation directions;

first lens group means, disposed before the picture elements of the liquid crystal panel means, for receiving the rays of the three primary colors from the three-direction means, and directing rays of the three primary colors into respective ones of the picture elements corresponding to the three primary colors of the liquid crystal panel means, the first lens group means including a plurality of first lens elements equal in number to the sets of three picture elements, each of the lens elements corresponding to a respective one of the sets of three picture elements; and second lens group means, disposed after the first lens group means and having a focal plane disposed at a position of the first lens group means, for receiving rays of the three primary colors having three respective mutually different propagation directions from one of (1) the first lens group means and (2) the picture elements of the liquid crystal panel means, and emitting rays of the three primary colors having three respective propagation directions substantially coinciding with one another, the second lens group means including a plurality of second lens elements equal in number to the sets of three picture elements, each of the second lens elements corresponding to a respective one of the sets of three picture elements.

9. A liquid crystal display according to claim 8, wherein the three-direction means includes three sheets of dichroic mirrors.

10. A liquid crystal display according to claim 8, wherein the three picture elements in each of the sets of three picture elements are disposed at a first predetermined pitch; and wherein the sets of three picture elements are disposed at a second predetermined pitch, the second predetermined pitch being greater than three times the first predetermined pitch.

11. A liquid crystal display according to claim 8, further comprising:

projection lens means disposed after the second lens group means; and screen means disposed after the projection lens means.

12. A liquid crystal display according to claim 11, wherein the projection lens has a pupil having a substantially rectangular shape.

13. A liquid crystal display according to claim 8, further comprising:

projection lens means disposed after the second lens group means;

screen means disposed after the projection lens means;

first one-dimensional light converging means disposed before a light incident side of the liquid crystal panel means for converging light in a first direction; and second one-dimensional light converging means disposed after a light emitting side of the liquid crystal panel means for converging light in a second direction perpendicular to the first direction.

14. A liquid crystal display according to claim 8, wherein the light source means includes three primary color light sources for respectively emitting rays of the three primary colors; and wherein the three-direction means includes collimator means for receiving the rays of the three primary colors from the three primary color light sources and emitting rays of the three primary colors having three respective mutually different propagation directions.

15. A liquid crystal display according to claim 8, wherein the second lens group means is disposed in the liquid crystal panel means adjacent to a plane in which the picture elements of the liquid crystal panel means are disposed.

16. A liquid crystal display including light source means and liquid crystal panel means, the liquid crystal panel means including picture elements corresponding to three primary colors, the liquid crystal display comprising:

three-direction means for receiving light from the light source means, and emitting rays of the three primary colors having three respective mutually different propagation directions;

first lens group means, disposed before the picture elements of the liquid crystal panel means, for receiving the rays of the three primary colors from the three-direction means, and directing rays of the three primary colors into respective ones of the picture elements corresponding to the three primary colors of the liquid crystal panel means; and second lens group means, disposed after the first lens group means, for receiving rays of the three primary colors having three respective mutually different propagation directions from the picture elements of the liquid crystal panel means, and emitting rays of the three primary colors having three respective propagation directions substantially coinciding with one another, the second lens group means including double-lenticular lens means disposed after a light emitting side of the liquid crystal panel means, the double-lenticular lens means including a first lenticular lens constituting a light incident side of the double-lenticular lens means and having a focal length about 0.5 to 1.5 times as large as a thickness of the double-lenticular lens means, and a second lenticular lens constituting a light emitting surface of the double-lenticular lens means and having a focal plane disposed at a position of the first lenticular lens.

\* \* \* \* \*